US012344941B2

(12) United States Patent
Xu et al.

(10) Patent No.: US 12,344,941 B2
(45) Date of Patent: Jul. 1, 2025

(54) AUTOMATIC DESCALING SYSTEM FOR HIGH-PRESSURE REACTOR OF LATERITE NICKEL ORE

(71) Applicants: PT QMB NEW ENERGY MATERIALS, Dki Jakarta (ID); PT ESG NEW ENERGY MATERIAL, Dki Jakarta (ID); GEM CO., LTD., Guangdong (CN); PT GEM INDONESIA NEW ENERGY MATERIALS, Dki Jakarta (ID)

(72) Inventors: Kaihua Xu, Guangdong (CN); Satryo Soemantri Brodjonegoro, Dki Jakarta (ID); Yaning Wang, Dki Jakarta (ID); Evan Wahyu Kristiyanto, Dki Jakarta (ID); Aad Alief Rasyidi Baking, Dki Jakarta (ID); Tegar Mukti Aji, Dki Jakarta (ID); Rizky Wanaldi, Dki Jakarta (ID); Andi Syaputra Hasibuan, Dki Jakarta (ID)

(73) Assignees: PT QMB NEW ENERGY MATERIALS, Jakarta Selatan (ID); PT ESG NEW ENERGY MATERIAL, Jakarta Selatan (ID); GEM CO., LTD, Shenzhen (CN); PT GEM INDONESIA NEW ENERGY MATERIALS, Jakarta Selatan (ID)

( * ) Notice: Subject to any disclaimer, the term of this patent is extended or adjusted under 35 U.S.C. 154(b) by 0 days.

(21) Appl. No.: 18/870,452

(22) PCT Filed: Jul. 31, 2023

(86) PCT No.: PCT/CN2023/110217
§ 371 (c)(1),
(2) Date: Nov. 29, 2024

(87) PCT Pub. No.: WO2025/025055
PCT Pub. Date: Feb. 6, 2025

(65) Prior Publication Data
US 2025/0171909 A1  May 29, 2025

(51) Int. Cl.
*C23G 3/00* (2006.01)
*C23G 1/02* (2006.01)

(52) U.S. Cl.
CPC ............... *C23G 3/00* (2013.01); *C23G 1/02* (2013.01)

(58) Field of Classification Search
CPC .................................. C23G 3/00; C23G 1/02
See application file for complete search history.

(56) References Cited

U.S. PATENT DOCUMENTS

| 4,374,101 A | * | 2/1983 | Lussiez | C01F 7/26 510/253 |
| 4,415,542 A | * | 11/1983 | Queneau | C22B 23/0415 423/159 |
| 5,535,992 A | * | 7/1996 | Krause | C22B 3/02 266/171 |

FOREIGN PATENT DOCUMENTS

| CA | 1126137 A | * | 6/1982 | ............... C23G 1/02 |
| CA | 3064524 A1 | * | 11/2018 | ............. B21B 45/06 |

(Continued)

OTHER PUBLICATIONS

International Search Report issued in corresponding International application No. PCT/CN2023/110217, mailed Nov. 21, 2023 (10 pages).

(Continued)

*Primary Examiner* — Benjamin L Osterhout

(57) ABSTRACT

Disclosed is an automatic descaling system for high-pressure reactor of laterite nickel ore, which comprises a high-pressure reactor, multiple mixing devices, multiple detection devices, and a scale removal assembly; within the reactor, multiple partition plates are arranged sequentially along the material flow direction, dividing the internal cavity of the (Continued)

reactor into multiple compartments. Multiple mixing devices are correspondingly installed within the multiple compartments, and multiple detection devices are correspondingly installed in the multiple compartments as well. The scale removal assembly comprises an acid storage tank, multiple first connecting pipes, and multiple first control valves. Multiple first control valves are correspondingly installed on the multiple first connecting pipes. This disclosure finely adjusts the amount of acid injected based on the thickness of the scale, not only achieving a better descaling effect but also correspondingly reducing the usage of acid, thereby lowering the production costs for enterprises.

13 Claims, 5 Drawing Sheets

(56) References Cited

FOREIGN PATENT DOCUMENTS

| CN | 102770552 | A | * | 11/2012 | ............... C08H 6/00 |
|---|---|---|---|---|---|
| CN | 103614571 | A | | 3/2014 | |
| CN | 204198814 | U | | 3/2015 | |
| CN | 106862180 | A | | 6/2017 | |
| CN | 207221902 | U | | 4/2018 | |
| CN | 207430286 | U | | 6/2018 | |
| CN | 209317627 | U | | 8/2019 | |
| CN | 111229145 | A | | 6/2020 | |
| CN | 112024551 | A | | 12/2020 | |
| CN | 113751436 | A | * | 12/2021 | |
| GB | 2026038 | A | * | 1/1980 | ............... C23G 1/02 |
| JP | 2005170982 | A | * | 6/2005 | |
| JP | 2019157233 | A | | 9/2019 | |
| RU | 2765778 | C2 | * | 2/2022 | ............... B01D 1/00 |

OTHER PUBLICATIONS

Written Opinion of the International Search Authority in corresponding International application No. PCT/CN2023/110217, mailed Nov. 21, 2023 (6 pages).

* cited by examiner

AUTOMATIC DESCALING SYSTEM FOR HIGH-PRESSURE REACTOR OF LATERITE NICKEL ORE

FIELD OF THE DISCLOSURE

The disclosure relates to the technical field of high-pressure leaching equipment for laterite nickel ore, in particular to an automatic descaling system for high-pressure reactor of laterite nickel ore.

BACKGROUND

In the current hydrometallurgical process for laterite nickel ore, the ore slurry, sulfuric acid, and steam are typically injected into a high-pressure reactor for smelting to extract nickel and cobalt from the laterite nickel ore. After the high-pressure reactor has been in operation, a scale mainly composed of iron and aluminum forms on its inner wall. When the scale accumulates to a significant amount, it is necessary to promptly remove it using acidic substances such as hydrochloric acid or sulfuric acid to avoid affecting the use of the high-pressure reactor.

A Chinese patent CN112024551A discloses a reactor cleaning and descaling system, which comprises a cleaning tank connected to the inlet of the reactor via a pipeline; an acidic cleaning solution container and an alkaline cleaning solution container, each connected to the cleaning tank via separate pipelines with a first solenoid valve and a second solenoid valve installed on these two pipelines respectively; a pH monitoring probe placed inside the reactor; a programmable controller electrically connected to the first solenoid valve, the second solenoid valve, and the pH monitoring instrument; a cleaning pump connected to the pipeline between the cleaning tank and the reactor; an acid-base neutralization device connected to the outlet of the reactor via a pipeline; and a water filter connected to both the cleaning tank and the acid-base neutralization device via separate pipelines.

Generally, high-pressure reactors are equipped with multiple compartments that are sequentially connected. The ore slurry, sulfuric acid, and steam enter each compartment in sequence, resulting in varying thicknesses of scale accumulation in each compartment. However, the aforementioned prior art only injects acidic cleaning solution through the inlet of the reactor, lacking targeted descaling based on the different thicknesses of scale in different compartments. This leads to a waste of acidic solution and increases production costs for enterprises.

SUMMARY

The purpose of this disclosure is to provide an automatic descaling system for high-pressure reactor of laterite nickel ore to solve the technical problem in existing technologies where, during the descaling of reactors, acidic cleaning solution is only injected through the inlet of the reactor, making it impossible to perform targeted descaling based on the varying thicknesses of scale deposits in different compartments. This results in the wastage of acid solution and increases the production costs for enterprises.

In order to solve the above technical problems, this disclosure provides an automatic descaling system for high-pressure reactor of laterite nickel ore, comprising:

a high-pressure reactor, which has a feed end and a discharge end at its opposite ends; inside the high-pressure reactor, multiple partition plates are sequentially arranged along the direction of material flow; these partition plates divide the interior cavity of the high-pressure reactor into multiple compartments, with each two adjacent compartments being interconnected;

multiple mixing devices, which correspond one-to-one with the multiple compartments, with each mixing device located within its corresponding compartment;

multiple detection devices, which also correspond one-to-one with the multiple compartments, with each detection device located within its corresponding compartment for measuring the thickness of scale accumulation within that compartment;

a scale removal assembly, which comprises an acid storage tank, multiple first connecting pipes, and multiple first control valves; the multiple first connecting pipes correspond one-to-one with the multiple compartments and are interconnected with them; each first connecting pipe is also connected to the acid storage tank, which is used to introduce acid solution into the corresponding compartment through each first connecting pipe to dissolve the scale; the multiple first control valves are installed correspondingly on the multiple first connecting pipes, serving to regulate the flow rate of the respective first connecting pipe; and, a control unit, which is electrically connected to the multiple mixing devices, the multiple detection devices, and the multiple first control valves; based on the detection results of the detection devices, the control unit controls the operation of the corresponding mixing device and first control valve.

Furthermore, the mixing device comprises a rotating shaft and a driving motor; the rotating shaft is rotatably installed along a vertical axis at the top of its corresponding compartment and extends out of the top of the compartment; stirring blades are arranged around the circumference of the rotating shaft; the driving motor is connected to the upper end of the rotating shaft through a transmission component to drive the rotation of the rotating shaft.

Furthermore, the rotating shaft is provided with a first flow channel that extends along its axial direction and multiple first acid spray holes that are connected to the first flow channel; the multiple first acid spray holes are arranged at intervals along the axial direction; the upper end of the first flow channel is connected to the corresponding first connecting pipe.

Furthermore, the first acid spray hole is tapered along the direction of acid flow; and/or, the first acid spray hole is gradually inclined downwards along the direction of acid flow.

Furthermore, multiple first acid spray holes constitute a first acid spray hole group, and multiple first acid spray hole groups are arranged at intervals along the circumferential direction of the rotating shaft.

Furthermore, the mixing device also comprises a sleeve that is compatible with the rotating shaft; the sleeve is slidably installed vertically on the outer circumference of the rotating shaft and is provided with multiple through holes, which are spaced apart along the axial direction of the sleeve; this allows for a communication state where the sleeve moves vertically downward so that multiple through holes align and communicate with multiple first acid spray holes one-to-one, and a closed state where the sleeve moves vertically upward so that the through holes are staggered from the first acid spray holes.

Furthermore, an annular installation groove is provided on the outer circumference of the rotating shaft, and the upper end of the sleeve is slidably installed within the installation groove, with a seal between the sleeve and the installation groove; a connection hole, which communicates with the first flow channel, is provided on the sidewall of the installation groove, positioned close to the bottom of the installation groove; when acid liquid is injected into the first flow channel through the connecting pipe, the acid liquid enters the installation groove through the connection hole, driving the sleeve to move vertically downward into the communication state; the mixing device also comprises an elastic component, with its two ends respectively connected to the lower end of the sleeve and the rotating shaft; the elastic component drives the sleeve to move vertically upward into a closed state.

Furthermore, the stirring rod assembly comprises multiple stirring rods arranged at intervals along the circumferential direction of the rotating shaft, each stirring rod is provided with a second flow channel and multiple second acid spray holes communicating with the second flow channel; the second flow channel is connected to the first flow channel, and the second acid spray holes are arranged at intervals along the axial direction of the stirring rod.

Furthermore, there are multiple stirring rod assemblies, which are arranged at intervals from top to bottom; the lengths of the stirring rods in these assemblies gradually decrease from top to bottom.

Furthermore, the transmission component comprises a driving gear, a gear set, and a driven gear; the driving gear is installed on the main shaft of the driving motor, and the driven gear is installed on the rotating shaft; the driving gear engages with the driven gear through the gear set.

Furthermore, the scale removal assembly comprises a water storage tank, multiple second connecting pipes, and multiple second control valves; the multiple second connecting pipes are connected in one-to-one correspondence with the multiple compartments, and each second connecting pipe is connected to the water storage tank; the water storage tank is used to input water into the corresponding compartment through each second connecting pipe to dilute the acid liquid; the multiple second control valves are installed in one-to-one correspondence with the multiple second connecting pipes and are used to regulate the flow rate of the corresponding second connecting pipe; the multiple second control valves are electrically connected to the control device to control the operation of the second control valves.

Furthermore, the scale removal assembly also comprises multiple mixing tanks, with each mixing tank corresponding to one of the multiple compartments; The corresponding first connecting pipe and second connecting pipe are connected to their respective mixing tank, and each mixing tank is connected to its corresponding compartment.

Furthermore, the scale removal assembly further comprises multiple first flowmeters and multiple second flowmeters; the multiple first flowmeters are installed in one-to-one correspondence with the multiple first connecting pipes and are used to detect the flow rate in the corresponding first connecting pipe; the multiple second flowmeters are installed in one-to-one correspondence with the multiple second connecting pipes and are used to detect the flow rate in the corresponding second connecting pipe; the multiple first flowmeters and the multiple second flowmeters are electrically connected to the control device.

Compared with existing technologies, the beneficial effect of this disclosure is: the high-pressure reactor is provided with a feed end and a discharge end at its opposite ends. Inside the high-pressure reactor, multiple partition plates are arranged sequentially along the direction of material flow, dividing the internal cavity of the reactor into multiple compartments, with each adjacent compartment being interconnected. A corresponding mixing device is installed in each compartment, and a corresponding detection device is also installed in each compartment to measure the thickness of the scale deposits within. Multiple first connecting pipes are connected to each compartment, respectively, and each first connecting pipe is connected to an acid storage tank, which supplies acid solution to the corresponding compartment through the respective first connecting pipe to dissolve the scale deposits. Multiple first control valves are installed on the first connecting pipes, regulating the flow rate through each pipe. During operation, the detection devices first measure the thickness of the scale deposits in each compartment. Once the scale in most compartments reaches a set thickness, the injection of slurry into the high-pressure reactor is halted. Subsequently, acid solution is injected into each compartment from the acid storage tank through the first connecting pipes to dissolve the scale deposits. The first control valves on the first connecting pipes control the amount of acid solution entering each compartment. Based on the varying thickness of the scale deposits, the quantity of injected acid solution is determined. For thicker deposits, the corresponding first control valve can be adjusted to increase the flow of acid solution into that compartment, while for thinner deposits, the valve can be adjusted to decrease the flow. At the same time, the mixing components are activated to accelerate the flow of acid solution within the compartments, enhancing the descaling efficiency. This configuration allows for precise adjustment of the amount of acid solution injected based on the thickness of the scale deposits, thus not only achieving a superior descaling effect but also reducing the consumption of acid solution accordingly, thereby lowering production costs for enterprises. Furthermore, the simultaneous injection of acid solution through multiple first connecting pipes accelerates the reaction rate and shortens the descaling time.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The preferred embodiments of this disclosure will be described in detail with reference to the accompanying drawings, which constitute a part of this disclosure and are used together with the embodiments to illustrate the principles of this disclosure, and are not intended to limit the scope of this disclosure.

Figure 1:
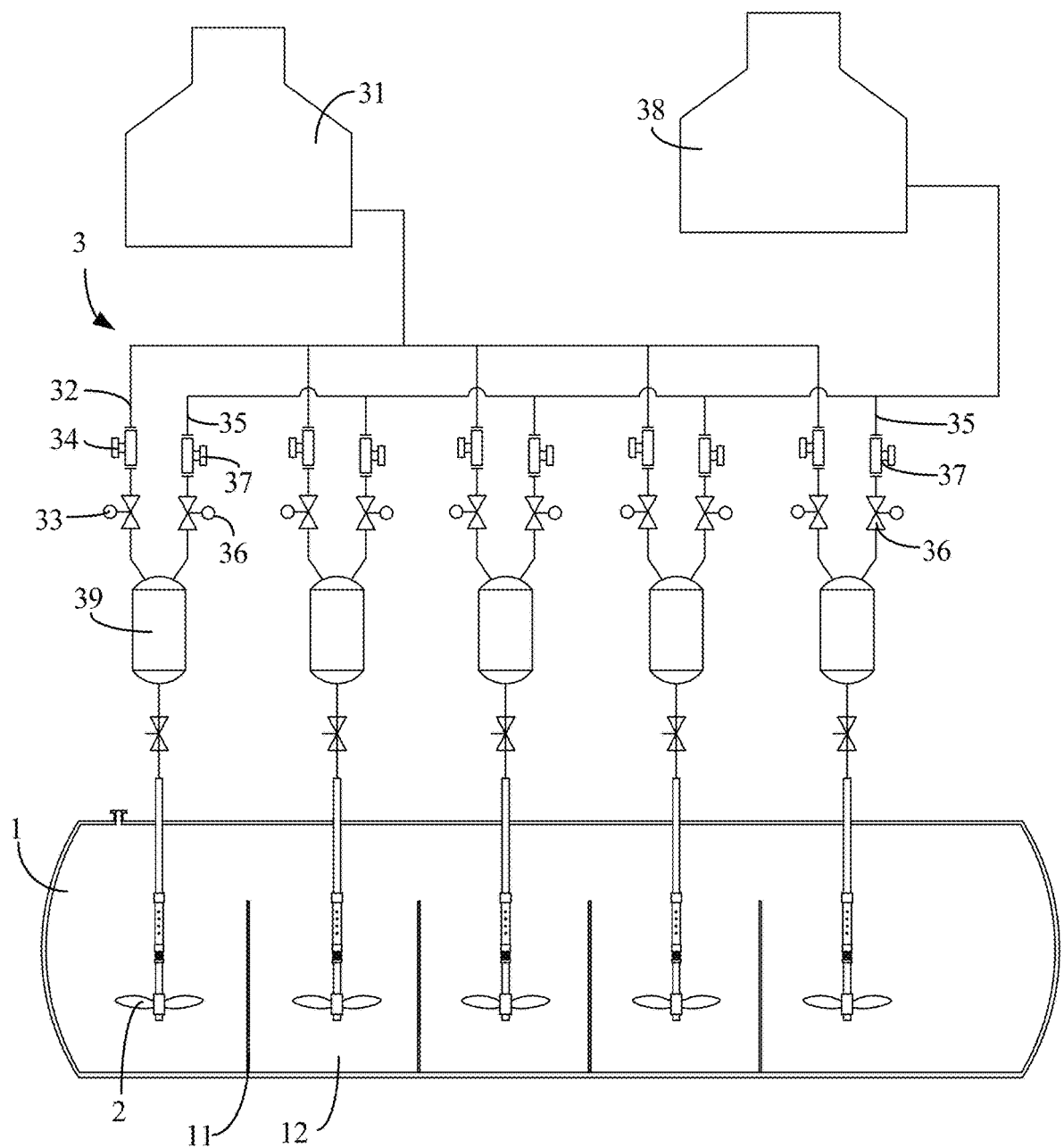
FIG. 1 is a structural schematic diagram of an embodiment of the automatic descaling system for high-pressure reactor of laterite nickel ore provided by this disclosure.
Figure 2:
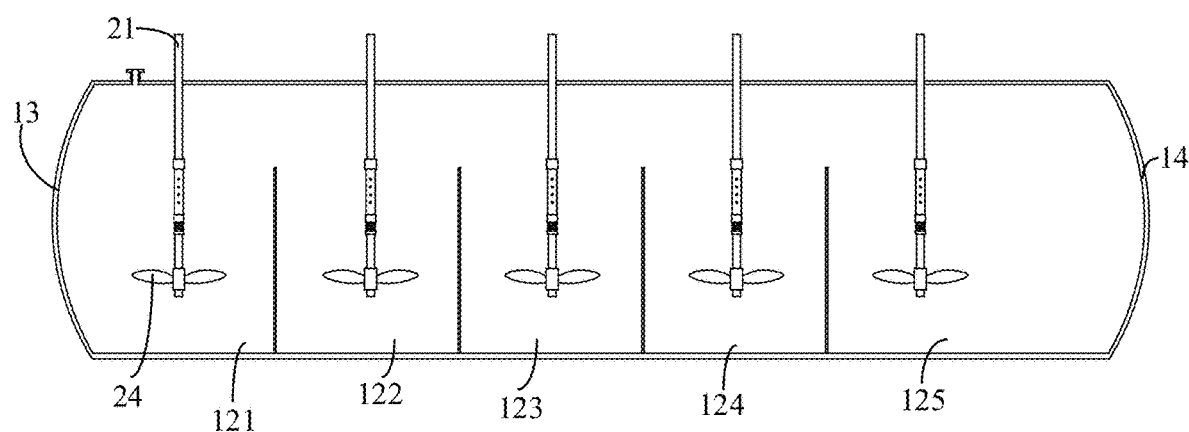
FIG. 2 is a sectional view of the high-pressure reactor shown in FIG. 1.
Figure 3:
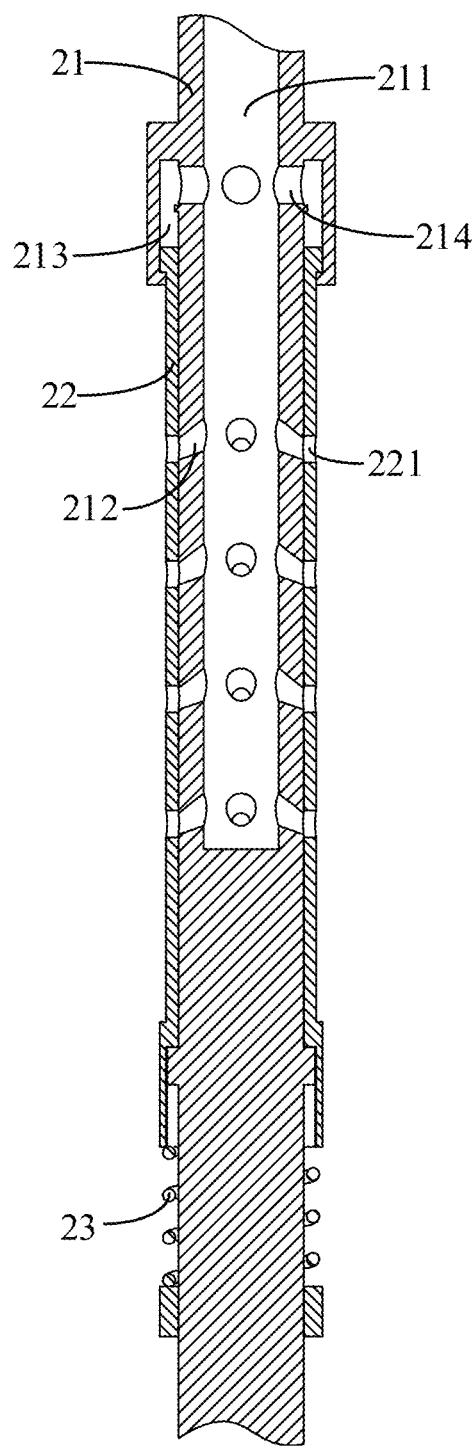
FIG. 3 is a partial sectional view of the rotating shaft section shown in FIG. 1, where the sleeve is in an open state.
Figure 4:
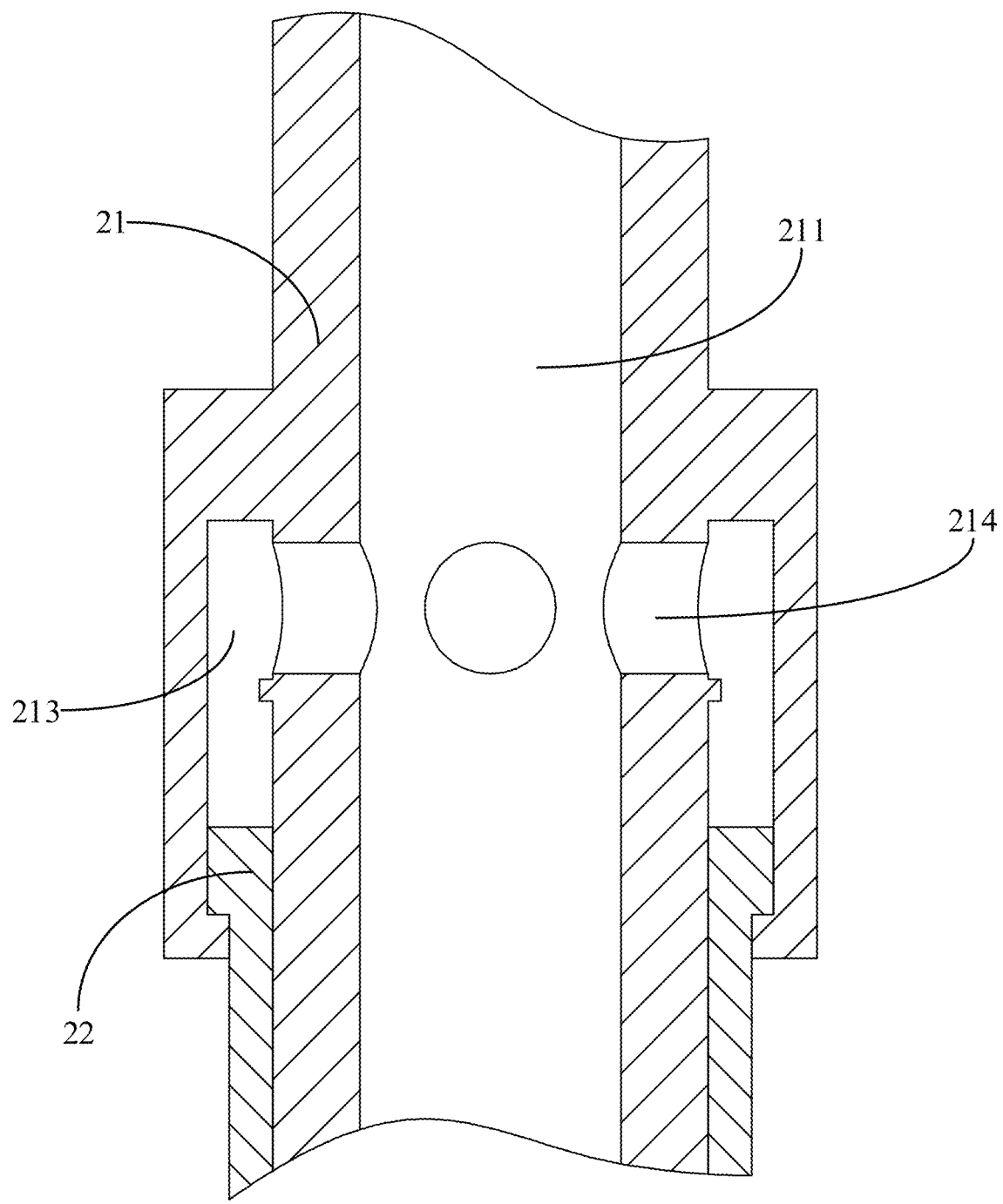
FIG. 4 is another partial sectional view of a different section of the rotating shaft shown in FIG. 1.
Figure 5:
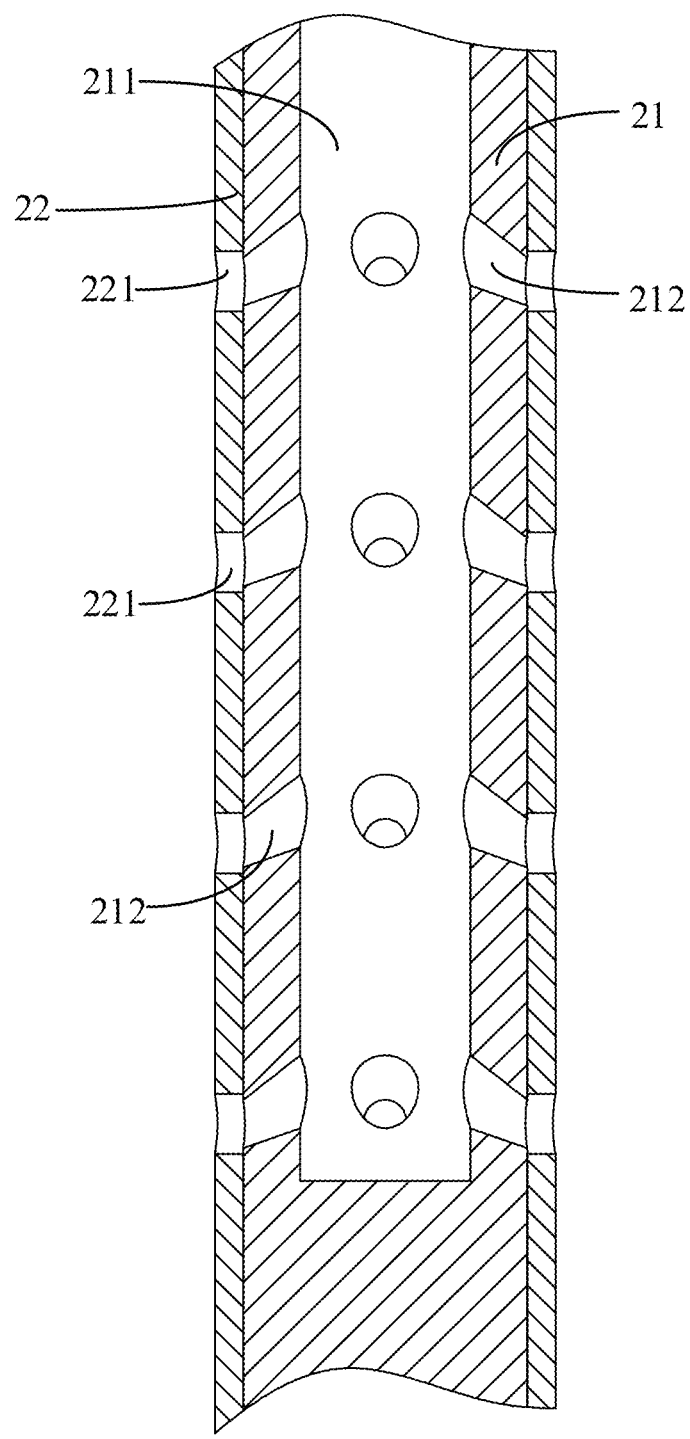
FIG. 5 is another partial sectional view of another section of the rotating shaft shown in FIG. 1.

Please refer to FIG. 1 to FIG. 5, this disclosure provides an automatic descaling system for high-pressure reactor of laterite nickel ore, which comprises a high-pressure reactor 1, multiple mixing devices 2, multiple detection devices, a scale removal assembly 3, and a control unit. The high-pressure reactor 1 has a feed end 13 and a discharge end 14 at opposite ends. Inside the high-pressure reactor 1, multiple partition plates 11 are arranged sequentially along the direction of material flow, dividing the interior cavity of the high-pressure reactor 1 into multiple compartments 12, with each two adjacent compartments 12 being interconnected. The multiple mixing devices 2 correspond one-to-one with the multiple compartments 12, with each mixing device 2 located within its corresponding compartment 12. The multiple detection devices also correspond one-to-one with the multiple compartments 12, with each detection device located within its corresponding compartment 12 for measuring the thickness of scale accumulation within that compartment.

The scale removal assembly 3 comprises an acid storage tank 31, multiple first connecting pipes 32, and multiple first control valves 33. The multiple first connecting pipes 32 correspond one-to-one with the multiple compartments 12 and are interconnected with them. Each first connecting pipe 32 is also connected to the acid storage tank 31, which is used to introduce acid solution into the corresponding compartment 12 through each first connecting pipe 32 to dissolve the scale. The multiple first control valves 33 are installed correspondingly on the multiple first connecting pipes 32, serving to regulate the flow rate of the respective first connecting pipe 32.

The control unit is electrically connected to the multiple mixing devices 2, the multiple detection devices, and the multiple first control valves 33. Based on the detection results of the detection devices, the control unit controls the operation of the corresponding mixing device 2 and first control valve 33.

In the automatic descaling system for high-pressure reactor of laterite nickel ore provided by this disclosure, the high-pressure reactor is provided with a feed end and a discharge end at its opposite ends. Inside the high-pressure reactor, multiple partition plates are arranged sequentially along the direction of material flow, dividing the internal cavity of the reactor into multiple compartments, with each adjacent compartment being interconnected. A corresponding mixing device is installed in each compartment, and a corresponding detection device is also installed in each compartment to measure the thickness of the scale deposits within. Multiple first connecting pipes are connected to each compartment, respectively, and each first connecting pipe is connected to an acid storage tank, which supplies acid solution to the corresponding compartment through the respective first connecting pipe to dissolve the scale deposits. Multiple first control valves are installed on the first connecting pipes, regulating the flow rate through each pipe. During operation, the detection devices first measure the thickness of the scale deposits in each compartment. Once the scale in most compartments reaches a set thickness, the injection of slurry into the high-pressure reactor is halted. Subsequently, acid solution is injected into each compartment from the acid storage tank through the first connecting pipes to dissolve the scale deposits. The first control valves on the first connecting pipes control the amount of acid solution entering each compartment. Based on the varying thickness of the scale deposits, the quantity of injected acid solution is determined. For thicker deposits, the corresponding first control valve can be adjusted to increase the flow of acid solution into that compartment, while for thinner deposits, the valve can be adjusted to decrease the flow. At the same time, the mixing components are activated to accelerate the flow of acid solution within the compartments, enhancing the descaling efficiency. This configuration allows for precise adjustment of the amount of acid solution injected based on the thickness of the scale deposits, thus not only achieving a superior descaling effect but also reducing the consumption of acid solution accordingly, thereby lowering production costs for enterprises. Furthermore, the simultaneous injection of acid solution through multiple first connecting pipes accelerates the reaction rate and shortens the descaling time.

Furthermore, the feed end 13 is provided with a slurry inlet, a steam inlet, and an acid inlet. The slurry inlet, the steam inlet, and the acid inlet are all connected to the compartment 12 that is closest to the feed end 13. Through these inlets, slurry, steam, and acid solution for reacting with the slurry are injected into the high-pressure reactor 1. The discharge end 14 is provided with a discharge outlet, which is connected to the compartment 12 closest to the discharge end 14. The discharge outlet is used for discharging the reacted slag and solution.

Furthermore, in this embodiment, there are four partition plates 11 provided, which divide the interior cavity of the high-pressure reactor 1 into five compartments 12. These five compartments 12, arranged sequentially along the direction of material flow, are designated as a first reactor compartment 121, a second reactor compartment 122, a third reactor compartment 123, a fourth reactor compartment 124, and a fifth reactor compartment 125. Among them, the first reactor compartment 121 is located at the feed end 13 and is connected to the slurry inlet, the steam inlet, and the acid inlet. The fifth reactor compartment 125 is located at the discharge end 14 and is connected to the discharge outlet.

It is understandable that the first reactor compartment 121, which is connected to the acid inlet and serves as the injection point for the entire high-pressure reactor 1, experiences a relatively fast flow rate, making it less prone to scaling. Therefore, the accumulation of scale in the first reactor compartment 121 is slower, and the scale thickness is smaller. The second reactor compartment 122, being close to the first reactor compartment 121, experiences localized overheating and over-acidification, leading to excessive leaching of $Fe^{3+}$ and $Al^{3+}$, which then undergo hydrolysis to produce a large amount of precipitate. Consequently, the accumulation of scale in the second reactor compartment 122 is faster, and the scale thickness is thicker. The third reactor compartment 123 and the fourth reactor compartment 124, being in the middle, have scale thicknesses that are greater than that of the first reactor compartment 121 but less than that of the second reactor compartment 122. The fifth reactor compartment 125, being close to the discharge end 14, experiences a slower flow rate, making it prone to particle deposition and thus severe scaling. Therefore, the scaling in the second reactor compartment 122 and the fifth reactor compartment 125 is more severe. To address this, a range of scale thickness values can be set. The detected values from the sensing devices in the second reactor compartment 122 and the fifth reactor compartment 125 can be compared to this range. If the detected values are below the range, it can be interpreted that the current scaling in the high-pressure reactor 1 is minimal and does not affect production, allowing production to continue. If the detected values fall within the range, it can be interpreted that the scaling in the high-pressure reactor 1 has started to affect production, necessitating a shutdown for descaling. After the shutdown, the specific scale thicknesses detected in the five compartments 12 by the five sensing devices can be used to adjust the amount of acid solution entering each compartment 12. This approach enables precise descaling while reducing the usage of acid solution. Once the sensing devices detect that the scale thicknesses in all compartments 12 have reached an acceptable range, the injection of acid solution into all compartments 12 can be stopped, and production can be resumed.

Furthermore, since the scale accumulation within the compartments 12 primarily occurs at the bottom of the compartments 12, in this embodiment, the sensing devices are installed at the top of the compartments 12.

Furthermore, there are no restrictions on the specific form of the sensing device, as long as it can detect the thickness of the scale. In this embodiment, the sensing device is an ultrasonic ranging sensor. The ultrasonic ranging sensor is positioned corresponding to the bottom of the compartment 12 and is used to measure the distance between it and the bottom of the compartment 12. Initially, the distance between the ultrasonic ranging sensor and the compartment 12 can be measured. As the compartment 12 continues to accumulate scale, the value measured by the ultrasonic ranging sensor will continuously decrease. The difference between the current measured distance and the distance measured after the initial descaling is completed represents the current thickness of the scale in the compartment 12. This method allows for the measurement of the scale thickness within the compartment 12.

Furthermore, there are no restrictions on the specific form of the mixing device 2. In this embodiment, the mixing device 2 comprises a rotating shaft 21 and a driving motor. The rotating shaft 21 is rotatably installed along the vertical axis at the top of the corresponding compartment 12, with its upper end protruding from the compartment 12. Stirring blades 24 are arranged on the circumference of the rotating shaft 21. The driving motor is connected to the upper end of the rotating shaft 21 through a transmission component to drive the rotation of the rotating shaft 21.

Furthermore, the transmission component comprises a driving gear, a gear set, and a driven gear. The driving gear is installed on the main shaft of the driving motor, and the driven gear is installed on the rotating shaft 21. The driving gear engages with the driven gear through the gear set. This arrangement increases the torque of the rotating shaft 21 and reduces its rotational speed, while also facilitating the connection between the first flow channel 211 and the first connecting pipe 32.

Furthermore, since the high-pressure reactor 1 operates under high pressure, and multiple first connecting pipes 32 are connected to the high-pressure reactor 1, to avoid creating too many holes in the high-pressure reactor 1, in this embodiment, the rotating shaft 21 is provided with a first flow channel 211 extending along its axial direction and multiple first acid spray holes 212 communicating with the first flow channel 211. The multiple first acid spray holes 212 are arranged at intervals along the axial direction. The upper end of the first flow channel 211 is connected to the corresponding first connecting pipe 32. During specific use, the acid liquid in the acid storage tank 31 enters the first flow channel 211 through the first connecting pipe 32 and is then injected into the compartment 12 through the first acid spray holes 212. This arrangement has several advantages: firstly, it avoids creating too many holes in the high-pressure reactor 1, which could affect its high-pressure environment; secondly, during descaling, the rotating shaft 21 is also rotating, and there are multiple first acid spray holes 212. When acid liquid is sprayed from the multiple first acid spray holes 212, due to the rotation of the rotating shaft 21 and the inertia effect, the acid liquid can be sprayed evenly throughout the compartment 12, covering a large area and improving the descaling rate.

Furthermore, the first connecting pipe 32 is connected to the upper end of the rotating shaft 21 through an adapter, which is capable of rotating relative to the rotating shaft 21. This arrangement prevents the first connecting pipe 32 from rotating along with the rotating shaft 21.

Furthermore, in this embodiment, the first acid spray hole 212 is tapered along the direction of acid liquid flow. This arrangement increases the flow velocity of the acid liquid at the first acid spray hole 212, resulting in a wider spray range of the acid liquid.

Furthermore, since the scale accumulation is mainly concentrated in the lower part of the compartment 12, in this embodiment, the first acid spray hole 212 is gradually inclined downwards along the direction of acid liquid flow. This arrangement ensures that the sprayed acid liquid is mainly concentrated in the lower half of the compartment 12 for descaling.

Furthermore, to improve the spraying efficiency of the acid liquid, in this embodiment, multiple first acid spray holes 212 constitute a first acid spray hole group, and multiple first acid spray hole groups are arranged at intervals along the circumferential direction of the rotating shaft 21. In other words, multiple first acid spray holes 212 are arranged in an array along both the radial and axial directions of the rotating shaft 21, increasing the injection amount of acid liquid.

Furthermore, during normal operation of the high-pressure reactor 1, ore pulp and acid are injected to react. To prevent gangue or solid particles in the ore pulp from blocking the first acid spray holes 212, in this embodiment, the mixing device 2 also comprises a sleeve 22 that is compatible with the rotating shaft 21. The sleeve 22 is slidably installed vertically on the outer circumference of the rotating shaft 21 and is provided with multiple through holes 221, which are spaced apart along the axial direction of the sleeve 22. This allows for a communication state where the sleeve 22 moves vertically downward so that multiple through holes 221 align and communicate with multiple first acid spray holes 212 one-to-one, and a closed state where the sleeve 22 moves vertically upward so that the through holes 221 are staggered from the first acid spray holes 212. Specifically, the number of through holes 221 corresponds to the number of first acid spray holes 212, and the through holes 221 and the first acid spray holes 212 are located in the same vertical plane. When the sleeve 22 slides vertically downward, the through holes 221 align with the first acid spray holes 212, placing the first acid spray holes 212 in a communication state for acid spraying. After acid spraying is completed, the sleeve 22 is driven to return vertically upward to its initial position, at which point the through holes 221 are staggered from the first acid spray holes 212, and the wall of the sleeve 22 blocks the first acid spray holes 212. By controlling the vertical movement of the sleeve 22, the opening and closing of the first acid spray holes 212 can be controlled, thereby preventing gangue or solid particles in the ore pulp from blocking the first acid spray holes 212 and ensuring normal acid injection during descaling.

Furthermore, the specific movement form of the sleeve 22 is not limited. In this embodiment, an annular installation groove 213 is provided on the outer circumference of the rotating shaft 21, and the upper end of the sleeve 22 is slidably installed within the installation groove 213, with a seal between the sleeve 22 and the installation groove 213. A connection hole 214, which communicates with the first flow channel 211, is provided on the sidewall of the installation groove 213, positioned close to the bottom of the installation groove 213. When acid liquid is injected into the first flow channel 211 through the connecting pipe, the acid liquid enters the installation groove 213 through the connection hole 214, driving the sleeve 22 to move vertically downward into the communication state. The mixing device 2 also comprises an elastic component 23, with its two ends respectively connected to the lower end of the sleeve 22 and the rotating shaft 21. The elastic component 23 drives the sleeve 22 to move vertically upward into a closed state. In the initial state, the sleeve 22 is in a closed state, and the first flow channel 211 is a sealed environment. When acid liquid is injected into the first flow channel 211 through the first connecting pipe 32, the acid liquid in the first flow channel 211 enters the installation groove 213 through the connection hole 214. As acid liquid continues to be injected, the pressure gradually increases, exerting a downward force on the sleeve 22. When this force is greater than the elastic force of the elastic component 23, it drives the sleeve 22 to move downward into a communication state. Since the diameter of the first acid spray hole 212 is much smaller than the diameter of the first flow channel 211, the acid liquid in the first flow channel 211 remains at a relatively high-pressure value, continuously exerting a downward force on the sleeve 22, keeping the sleeve 22 in the communication state and achieving the purpose of spraying acid into the compartment 12 through the first acid spray hole 212. When acid injection through the first connecting pipe 32 stops, the sleeve 22 is driven by the elastic component 23 to move vertically upward and return to its initial position, i.e., the closed state. This prevents gangue from blocking the first acid spray hole 212.

Furthermore, the mixing device 2 also comprises a stirring rod assembly. The stirring rod assembly comprises multiple stirring rods arranged at intervals along the circumferential direction of the rotating shaft 21. Each stirring rod is provided with a second flow channel and multiple second acid spray holes communicating with the second flow channel. The second flow channel is connected to the first flow channel 211, and the second acid spray holes are arranged at intervals along the axial direction of the stirring rod. This configuration not only increases the number of stirring rods to accelerate the flow of acid liquid but also increases the injection amount of acid liquid, thereby enhancing the efficiency of scale removal.

Furthermore, there are multiple stirring rod assemblies, which are arranged at intervals from top to bottom. The lengths of the stirring rods in these assemblies gradually decrease from top to bottom.

Furthermore, since the acid liquid in the acid storage tank 31 is a strong acid prepared in the acid preparation unit of the equipment system for preparing new energy nickel-cobalt-manganese raw materials from laterite nickel ore, and the acid concentration is relatively high, in compartments 12 with a smaller scale thickness, the required amount of acid liquid is smaller. This results in a situation where the acid liquid cannot immerse most of the area of the compartment 12, leading to incomplete removal of the scale. To solve this issue, in this embodiment, the scale removal assembly 3 further comprises a water storage tank 38, multiple second connecting pipes 35, and multiple second control valves 36.

The multiple second connecting pipes 35 are connected in one-to-one correspondence with the multiple compartments 12, and each second connecting pipe 35 is connected to the water storage tank 38. The water storage tank 38 is used to input water into the corresponding compartment 12 through each second connecting pipe 35 to dilute the acid liquid. The multiple second control valves 36 are installed in one-to-one correspondence with the multiple second connecting pipes 35 and are used to regulate the flow rate of the corresponding second connecting pipe 35. The multiple second control valves 36 are electrically connected to the control device to control the operation of the second control valves 36. With this configuration, by injecting more water into the compartments 12 with a smaller amount of acid injection, on the one hand, the strong acid is diluted, increasing the amount of liquid in the compartments 12 so that most of the scale can be immersed in the acid liquid, avoiding incomplete scale removal. On the other hand, it allows the stirring blades 24 on the rotating shaft 21 and the stirring rods to come into contact with the liquid, accelerating the flow of the liquid.

Furthermore, in order to ensure that the water and strong acid are fully mixed and uniformly injected into the compartments 12, in this embodiment, the scale removal assembly 3 further comprises multiple mixing tanks 39. The multiple mixing tanks 39 correspond one-to-one with the multiple compartments 12. The corresponding first connecting pipe 32 and second connecting pipe 35 are connected to the corresponding mixing tank 39, and the mixing tank 39 is connected to the corresponding compartment 12. This allows the strong acid and water to be mixed in the mixing tank 39 before being injected into the compartment 12, avoiding the issue of uneven mixing.

Furthermore, to facilitate the adjustment of the ratio of water to the strong acid, in this embodiment, the scale removal assembly 3 further comprises multiple first flowmeters 34 and multiple second flowmeters 37. The multiple first flowmeters 34 are installed in one-to-one correspondence with the multiple first connecting pipes 32 and are used to detect the flow rate in the corresponding first connecting pipe 32. The multiple second flowmeters 37 are installed in one-to-one correspondence with the multiple second connecting pipes 35 and are used to detect the flow rate in the corresponding second connecting pipe 35. The multiple first flowmeters 34 and the multiple second flowmeters 37 are electrically connected to the control device. By using the first flowmeters 34 and the second flowmeters 37, the flow rates in the first connecting pipes 32 and the second connecting pipes 35 can be monitored in real-time, allowing the control device to control the flow rates in the first connecting pipes 32 and the second connecting pipes 35 through the first control valves 33 and the second control valves 36, enabling more precise adjustment.

The above is only a preferred specific embodiment of this disclosure, but the scope of protection of this disclosure is not limited to this. Any changes or substitutions that can be easily conceived by those skilled in the art within the scope of the disclosed technology should be included in the scope of protection of this disclosure.

What is claimed is:

1. An automatic descaling system for high pressure reactor of laterite nickel ore: comprising:
   a reactor, which has a feed end and a discharge end at its opposite ends; inside the reactor, multiple partition plates are sequentially arranged along the direction of material flow; these partition plates divide the interior cavity of the reactor into multiple compartments, with each two adjacent compartments being interconnected;

multiple mixing devices, which correspond one-to-one with the multiple compartments, with each mixing device located within its corresponding compartment;

multiple detection devices, which also correspond one-to-one with the multiple compartments, with each detection device located within its corresponding compartment for measuring the thickness of scale accumulation within that compartment;

a scale removal assembly, which comprises an acid storage tank, multiple first connecting pipes, and multiple first control valves; the multiple first connecting pipes correspond one-to-one with the multiple compartments and are interconnected with them; each first connecting pipe is also connected to the acid storage tank, which is used to introduce acid solution into the corresponding compartment through each first connecting pipe to dissolve the scale; the multiple first control valves are installed correspondingly on the multiple first connecting pipes, serving to regulate the flow rate in or through the respective first connecting pipe; and, a control unit, which is electrically connected to the multiple mixing devices, the multiple detection devices, and the multiple first control valves; based on detection results of the detection devices, the control unit controls the operation of the corresponding mixing device and first control valve.

2. The automatic descaling system for reactor of laterite nickel ore according to claim 1, wherein each mixing device comprises a rotating shaft and a driving motor; the rotating shaft is rotatably installed along a vertical axis at the top of its corresponding compartment and extends out of the top of the compartment; stirring blades are arranged around the circumference of the rotating shaft; the driving motor is connected to the upper end of the rotating shaft through a transmission component to drive the rotation of the rotating shaft.

3. The automatic descaling system for reactor of laterite nickel ore according to claim 2, wherein the rotating shaft is provided with a first flow channel that extends along its axial direction and multiple first acid spray holes that are connected to the first flow channel; the multiple first acid spray holes are arranged at intervals along the axial direction; the upper end of the first flow channel is connected to the corresponding first connecting pipe.

4. The automatic descaling system for reactor of laterite nickel ore according to claim 3, wherein the first acid spray hole is tapered along the direction of acid flow; and/or, the first acid spray hole is inclined downwards along the direction of acid flow.

5. The automatic descaling system for reactor of laterite nickel ore according to claim 3, wherein multiple first acid spray holes constitute a first acid spray hole group, and multiple first acid spray hole groups are arranged at intervals along the circumferential direction of the rotating shaft.

6. The automatic descaling system for reactor of laterite nickel ore according to claim 3, wherein each mixing device also comprises a sleeve that is compatible with the rotating shaft; the sleeve is slidably installed vertically on the outer circumference of the rotating shaft and is provided with multiple through holes, which are spaced apart along the axial direction of the sleeve; this allows for a communication state where the sleeve moves vertically downward so that multiple through holes align and communicate with multiple first acid spray holes one-to-one, and a closed state where the sleeve moves vertically upward so that the through holes are staggered from the first acid spray holes.

7. The automatic descaling system for reactor of laterite nickel ore according to claim 6, wherein an annular installation groove is provided on the outer circumference of the rotating shaft, and the upper end of the sleeve is slidably installed within the installation groove, with a seal between the sleeve and the installation groove; a connection hole, which communicates with the first flow channel, is provided on the sidewall of the installation groove, positioned close to the bottom of the installation groove; when acid liquid is injected into the first flow channel through the connecting pipe, the acid liquid enters the installation groove through the connection hole, driving the sleeve to move vertically downward into the communication state;

each mixing device also comprises an elastic component, with its two ends respectively connected to the lower end of the sleeve and the rotating shaft; the elastic component drives the sleeve to move vertically upward into a closed state.

8. The automatic descaling system for reactor of laterite nickel ore according to claim 3, wherein each mixing device also comprises a stirring rod assembly, the stirring rod assembly comprises multiple stirring rods arranged at intervals along the circumferential direction of the rotating shaft, each stirring rod is provided with a second flow channel and multiple second acid spray holes communicating with the second flow channel;

the second flow channel is connected to the first flow channel, and the second acid spray holes are arranged at intervals along the axial direction of the stirring rod.

9. The automatic descaling system for reactor of laterite nickel ore according to claim 8, wherein there are multiple stirring rod assemblies, which are arranged at intervals from top to bottom; the lengths of the stirring rods in these assemblies decrease from top to bottom.

10. The automatic descaling system for reactor of laterite nickel ore according to claim 2, wherein the transmission component comprises a driving gear, a gear set, and a driven gear; the driving gear is installed on a main shaft of the driving motor, and the driven gear is installed on the rotating shaft; the driving gear engages with the driven gear through the gear set.

11. The automatic descaling system for reactor of laterite nickel ore according to claim 1, wherein the scale removal assembly comprises a water storage tank, multiple second connecting pipes, and multiple second control valves; the multiple second connecting pipes are connected in one-to-one correspondence with the multiple compartments, and each second connecting pipe is connected to the water storage tank; the water storage tank is used to input water into the corresponding compartment through each second connecting pipe to dilute the acid liquid; the multiple second control valves are installed in one-to-one correspondence with the multiple second connecting pipes and are used to regulate the flow rate in or through the corresponding second connecting pipe; the multiple second control valves are electrically connected to the control device to control the operation of the second control valves.

12. The automatic descaling system for reactor of laterite nickel ore according to claim 11, wherein the scale removal assembly also comprises multiple mixing tanks, with each mixing tank corresponding to one of the multiple compartments, the corresponding first connecting pipe and second connecting pipe are connected to their respective mixing tank, and each mixing tank is connected to its corresponding compartment.

13. The automatic descaling system for reactor of laterite nickel ore according to claim 12, wherein the scale removal assembly further comprises multiple first flowmeters and multiple second flowmeters; the multiple first flowmeters are installed in one-to-one correspondence with the multiple first connecting pipes and are used to detect the flow rate in the corresponding first connecting pipe; the multiple second flowmeters are installed in one-to-one correspondence with the multiple second connecting pipes and are used to detect the flow rate in the corresponding second connecting pipe; the multiple first flowmeters and the multiple second flowmeters are electrically connected to the control device.

* * * * *